3,407,082
TIRE SEALING COMPOSITION
John R. Mineo, 16 Putnam St., Union City, Pa. 16438
No Drawing. Continuation-in-part of application Ser.
No. 263,123, Mar. 6, 1963. This application Dec.
14, 1966, Ser. No. 601,564
1 Claim. (Cl. 106—33)

ABSTRACT OF THE DISCLOSURE

The present invention involves making a sealing material to seal air leaks in pneumatic tires. The sealing material is made from evaporated animal milk to which is added hexachlorophene, methyl paraben, and propylparaben.

This application is a continuation in part application of patent application, Ser. No. 263,123, filed Mar. 6, 1963 and now abandoned.

This invention relates to materials for sealing air leaks in pneumatic tires and, more particularly, to materials for sealing air leaks such as rim leaks and pin hole leaks in tubeless tires.

Tubeless tires depend upon a perfect seal between the rim of the wheel and the bead of the tire. If the sealing surface of the bead of the tire becomes damaged or distorted, the tire will leak air.

It has been discovered that by providing a condensed animal milk, for example, cow's milk, leakage of the tire can be prevented and tires which leak can be fixed so that they will not leak.

It is, accordingly, an object of this invention to provide an improved material for preventing the leakage of pneumatic tires.

Another object of the invention is to provide an improved material to prevent the leakage of air from tubeless tires.

A further object of the invention is to provide an improved tire treating material.

Other objects and advantages of the present invention will become obvious from the following description and appended claims.

An example of the material used herein is:

Example I 8 to 10 oz. hexachlorophene
8 oz. methyl paraben
2 to 3½ oz. propylparaben
500 gals, evaporated animal milk The hexachlorophene is used in the composition to inhibit the growth of spores and bacteria in the other substances in the milk. The methyl paraben is used to prevent the growth of mold in the other substances and the propylparaben prevents the growth of yeast in the other materials. Evaporated milk dries and seals the leakage between the rim and the tire bead. The evaporated milk forms a vehicle for carrying its solids into the leak.

The term evaporated milk as used herein includes any animal milk where the water content has been reduced to render the milk of the consistency of commercial condensed milk now available in grocery stores and sufficiently fluid to give good flowability.

The following is a definition of para-hydroxybenzoic acid esters: The homologous series of alkyl esters of para-hydroxybenzoic acid are commonly referred to as parabens. The various individual compounds of the series are referred to as, e.g., methyl paraben, propyl paraben, etc. These materials are commonly prepared by the reaction of para-hydroxybenzoic acid with alcohols such as, e.g., methyl alcohol, which gives "methyl paraben." The parabens are commonly used as preservatives for products susceptible to spoilage due to micro-organism attack. They exhibit an additive protective effect and are frequently used in combination. A definition of a methyl paraben is found in Synthetic Organic Chemical Mfg. Association, SOCMA Handbook, Commercial Organic Chemical Names, Publication of Chemical Abstracts Service, ACS 1966, Library of Congress Cat. Card 65-23475, Part. III, p. 33E, p-hydroxybenzoic acid, methyl ester, methyl paraben, p. 89G, p-hydroxybenzoic acid, propyl ester, propyl paraben.

The foregoing could be varied by using a larger quantity of the hexachlorophene, methyl paraben, and propylparaben. The ratio of evaporated milk to the other ingredients could be varied between limits so long as sufficient milk is used to give the other ingredients a good flowability.

Since many modifications are possible in the product of this invention as above described without departing from the scope of the invention, it is intended that the above description of this invention should be interpreted as illustrative, and the invention is not to be limited except as set forth in the claims which follow.

The embodiments of the invention in which an exclusive property or privilege is claimed are defined as follows:

1. A composition for use in sealing leaks in pneumatic tires composed of eight to ten ounces of hexachlorophene, eight ounces of methyl paraben, two to three and one-half ounces of propylparaben, and approximately five hundred gallons of evaporated animal milk.

References Cited

UNITED STATES PATENTS

| | | | |
|---|---|---|---|
| 616,459 | 12/1898 | Gaa | 106—33 |
| 2,286,963 | 6/1942 | Houser et al. | 106—33 |

DONALD J. ARNOLD, Primary Examiner.